US009805207B1

(12) United States Patent (10) Patent No.: US 9,805,207 B1
Nijim et al. (45) Date of Patent: Oct. 31, 2017

(54) SHARING TV CONTENT WITH FRIENDS

(71) Applicant: Cox Communications, Inc., Atlanta, GA (US)

(72) Inventors: Yousef Wasef Nijim, Roswell, GA (US); Jay Paul Langa, Cumming, GA (US); James Alan Strothmann, Johns Creek, GA (US)

(73) Assignee: COX COMMUNICATIONS, INC, Atlanta, GA (US)

( * ) Notice: Subject to any disclaimer, the term of this patent is extended or adjusted under 35 U.S.C. 154(b) by 0 days.

(21) Appl. No.: 14/329,502

(22) Filed: Jul. 11, 2014

(51) Int. Cl.
G06F 7/04 (2006.01)
G06F 17/30 (2006.01)
H04N 7/16 (2011.01)
G06F 21/62 (2013.01)

(52) U.S. Cl.
CPC .................... G06F 21/62 (2013.01)

(58) Field of Classification Search
CPC ....................................... G06F 21/62
USPC ........................................... 726/28
See application file for complete search history.

(56) References Cited

U.S. PATENT DOCUMENTS

| 9,167,275 | B1* | 10/2015 | Daily | H04N 21/812 |
| 2012/0214443 | A1* | 8/2012 | Daigle | H04L 9/3228 |
| | | | | 455/411 |
| 2012/0331529 | A1* | 12/2012 | Ibel | G06F 21/6218 |
| | | | | 726/4 |
| 2014/0229544 | A1* | 8/2014 | Evans | G06Q 50/01 |
| | | | | 709/204 |
| 2014/0258713 | A1* | 9/2014 | Kanungo | H04N 7/165 |
| | | | | 713/156 |
| 2014/0282772 | A1* | 9/2014 | Chen | H04N 21/26258 |
| | | | | 725/97 |
| 2014/0330857 | A1* | 11/2014 | Hunter | G06F 17/30684 |
| | | | | 707/767 |

\* cited by examiner

*Primary Examiner* — Harunur Rashid
*Assistant Examiner* — Quy Pham
(74) *Attorney, Agent, or Firm* — Merchant & Gould (57) ABSTRACT

Video content sharing is provided. A user may select friends from various social networking site accounts and aggregate those friends into a friends list with the user's video service provider. The user may select a video to share, select friends with whom he/she would like to share the video, and a link to the video may be created. The video link, a token, and, if applicable, a link to download a video player may be sent to each selected friend in an invitation via email, text, programming guide, or social media services. The token may be used for tracking the sender and the receiver of the video, contain authorization information allowing each friend to watch protected content, and may be used to authenticate the receiving user. Each friend may be enabled to stream the shared video and watch the content based on rules associated with the token.

18 Claims, 8 Drawing Sheets

SHARING TV CONTENT WITH FRIENDS

BACKGROUND

Watching television has historically been and continues to be a social activity. While in the past, users would typically gather in a same room and view a television program together, the current and growing trend is for users to watch television content individually and share what they are watching with friends. Some users, for example, those who have the same video service subscription, may be able to watch the same content at the same time; however, other users may not have access to the same content as their friends. Another current and growing trend amongst users is to share videos via social media sites; however, videos are restricted to non-copyright content.

Oftentimes, users desire to share protected video content with others who may or may not have access to the content. It is with respect to these and other considerations that the present invention has been made.

BRIEF SUMMARY

The above and other problems are solved by providing video content sharing. According to embodiments, a user may select friends from one or more social networking site accounts and aggregate those friends into a friends list with the user's video service provider. When a user selects a video content item he/she would like to share with one or more of his/her friends, a link to the video content items may be created. The user may select which friends he/she would like to share the video content item with, and the link to the video content item, a token, and, if applicable, a link to download a video player may be sent to each selected friend in an invitation. Each friend may be enabled to stream the shared video content item and watch the content based on rules associated with the token.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention.

BRIEF DESCRIPTION OF DRAWINGS

Referring now to the drawings in which like reference numbers represent corresponding parts throughout.

DETAILED DESCRIPTION

Embodiments provide for sharing of video content. A subscriber may be enabled to share a selected video content item with his/her friends. The subscriber may aggregate his/her friends from various social networking sites and from various contacts lists into a centralized storage. An encrypted link to the video content item may be sent to a selected number of the subscriber's friends whether they are subscribers of video services or not. Additionally, a token may be sent, which may be used for tracking the sender and the receiver of the shared video content item, may comprise authorization information allowing the friend to watch protected content, and may authenticate the receiving user. Each friend may be able to stream the shared video content item and watch the content based on rules associated with the token. According to an embodiment, to watch a shared video content item, the receiving user may be required to watch the video via a service provider video player, which may be a local video player or a cloud-based video player. A link to download the serviced provider video player may be sent with the shared video content item.

These embodiments may be combined, other embodiments may be utilized, and structural changes may be made without departing from the spirit or scope of the present invention. The following detailed description is therefore not to be taken in a limiting sense. Referring now to the drawings, in which like numerals refer to like elements throughout the several figures, embodiments of the present invention and an exemplary operating environment will be described.

Figure 1:
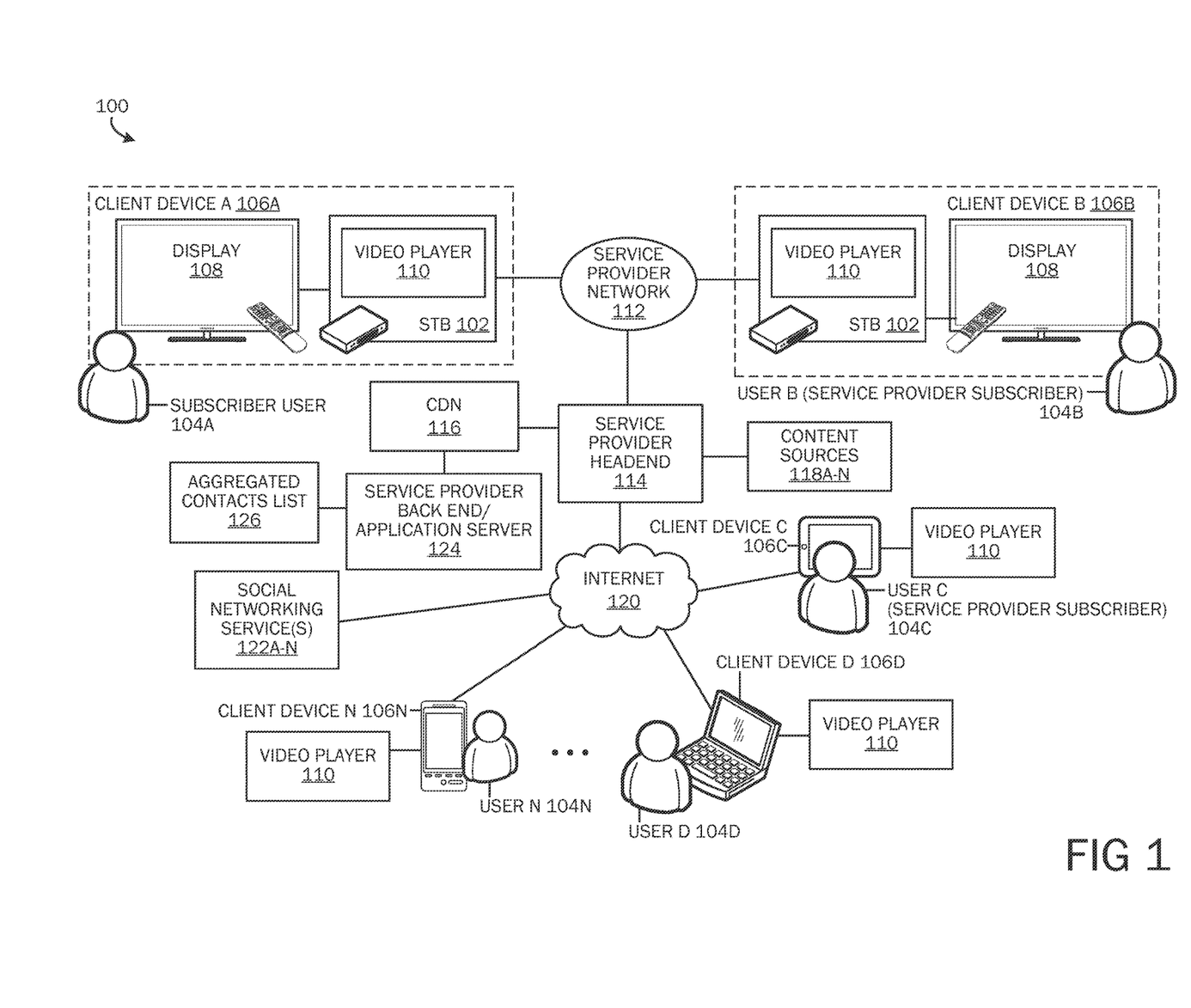
FIG. 1 is a simplified block diagram illustrating one embodiment of a system for providing video content sharing.

FIG. 1 is a block diagram of one embodiment of a subscriber television system with integrated video sharing. Although embodiments are illustrated and described as a cable television system, in other embodiments, the subscriber television system may be one of various types of subscriber television systems, for example, a satellite-based television service provider, an Internet protocol-based service provider, or any other service provider that is operable to provide audio, video, or a combination of audio and video content to users/subscribers for consumption via a variety of client devices 106. A detailed illustration and description of an example cable television services provider system is provided below with reference to FIG. 7.

The video sharing system 100 includes a first client device 106A, which may comprise a converter, such as a set-top box 102 and a display 108 at a physical location associated with a cable system subscriber account. The client device 106A may comprise a local service provider video player 110, or the provider video player 110 may be network-based and linked by a network to the client device 106A, the service provider video player 110 operable to perform specific operations to enable the user 104 to play shared video content based on authorization provided by a token or other authorization information. The service provider video player 110 may be in the form of an embedded application, a downloaded application, or a network-based application.

In various embodiments, the display 108 is part of a television set. A subscriber user 104A may create one or more user profiles corresponding to individuals associated with the subscriber account, or alternatively, one or more default user profiles may be automatically created and associated with the subscriber account. The set-top box 102 may be connected to a service provider network 112, such as a hybrid fiber-coax (HFC) network, and serves as the client that allows the subscriber user 104A to share video content with other users 104B-N (collectively 104).

The service provider network 112 may be connected with an Internet protocol (IP) network, such as the Internet 120. One or more social networking services 122A-N (collectively 122) may be accessed by the set-top box 102 via the Internet 120 and the service provider network 112. The other users 104B-N are not limited to using the set-top box 102 as a client 106 and may receive and view shared videos using any number of various clients 106A-N including, but not limited to, phones/smart phones/camera phones 106N, computers 106D, tablets 106C, cable-ready, satellite-ready, or IP-enabled televisions, etc.

A service provider content delivery network (CDN) 116 is illustrated in association with a service provider headend 114, and a service provider back end and application server 124 are illustrated in association with the service provider CDN 116. As should be appreciated, the layout of the functionalities of the service provider including the service provider CDN 116 and the service provider back end and application server system 124 are for purposes of illustration only and are not restrictive of the various layouts and combinations of systems that may be utilized by a given service provider for providing content to users/subscribers 104.

A service provider back end/application server 124 may provide functionality for maintaining profile information on the subscriber user 104A including permissions for the subscriber user 104A to utilize service provider functionality including consumption of service provider content and including such functionalities as content preferences, parental control systems, billing systems, and the like. The back end and application server 124 for the service provider may provide operating functionality, for example, one or more software applications and associated databases for directing content distribution provided by the service provider to users/subscribers 104 at client devices 106.

According to embodiments, the subscriber user's 104A friends lists and contacts lists may be aggregated across the subscriber user's 104A one or more social networking service 122 accounts, from a contacts list within the service provider system, and from other contacts lists. The friends lists and contacts lists may be sent to the back end application server 124, and stored in an aggregated contacts list 126. According to an embodiment, the subscriber user's 104A friends and contacts lists may be automatically populated into the aggregated contacts list 126. Service provider information may be specified based on credentials and provided account information, if known. According to another embodiment, specific friends or contacts, herein referred to as users 104B-N, may be manually selected from each of the subscriber user's 104A social networking service 122 accounts, contacts list within the service provider system, and from other contacts lists for population into the aggregated contacts list 126.

The service provider content delivery network (CDN) 116 is illustrative of a delivery or distribution network which may include a distributed system of servers, databases, and other content repositories for distributing audio and video content, text, graphics, media files, software applications and associated documents, on-demand content, social media content, live streaming media content, and the like from the service provider to users/subscribers 104. CDNs 116 typically function by receiving requests from clients 106, checking a local cache for a copy of the requested resource, or querying some source if a requested resource is not in the cache or has expired for example. CDN servers can be strategically located at the edges of various networks to limit loads on network interconnects and backbones. CDN servers can be redundantly deployed and interact with other CDN servers to respond to content requests from clients 106 in attempts to optimize content delivery. For example, network edge servers can enable ease of browsing, navigating and streaming of content, including streaming live video. For example, if a given user/subscriber 104 operating a tablet computing device 106C selects a news story for live streaming to the tablet computing device 106C as offered by the service provider, the application server at the back end application server 124 may cause a media player to activate for streaming the desired content from the service provider CDN 116 to the user's tablet computing device 106C via IP-based transmission to the tablet computing device 106C.

The service provider gathers content from a variety of content sources 118A-N (collectively 118) including network feeds, stored media, communication links, video on demand sources, Internet sources, and live studio sources. The service provider headend 114 converts the content into a form that can be managed and distributed, then stores, moves and sends out (playout) the media at scheduled times. The service provider network 112 simultaneously transfers multiple channels to subscribers/users 104 who are connected to the service provider system. Users 104 view video content on displays 108 (e.g., televisions) that are directly connected to a cable line (e.g., cable ready TVs) or through an adapter box (set top box 102). Video content may also be provided to clients 106 via use of IP networks (e.g., the Internet 120), which may be utilized to process and receive multimedia communications using IP protocol.

Embodiments of the system may also personalize advertising. An ad insertion system may be implemented to fill empty advertising slots or to replace existing advertising with ads that may be more personally tailored to the user according to user viewing data and/or the user's location.

Figure 2:
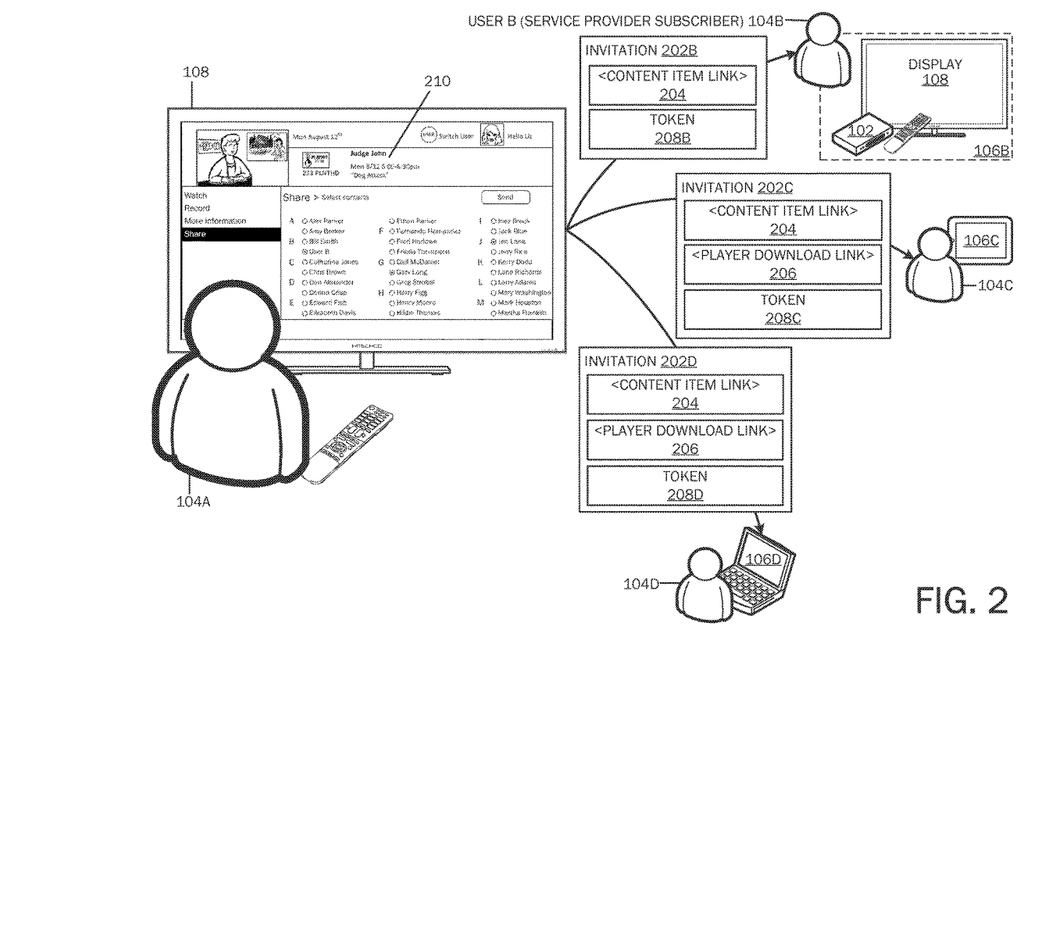
FIG. 2 illustrates an example of a subscribing user sharing a video content item with a plurality of users.

As briefly described above and according to an example illustrated in FIG. 2, a subscriber user 104A may select to share a video content item 210 with one or more other users 104 who may or may not be subscribers of video services. Upon selection of a video content item 210 that the subscriber user 104A wishes to share, the subscriber user 104A may be presented with the aggregated contacts list 126, which may be a dynamic list based on collected information. The subscriber user 104A may select one or more users 104B-N from the list, and invitations 202B-D comprising a link to the video content item 210 (herein referred to as a content item link 204) may be sent to each of the selected one or more users 104. In the example illustrated in FIG. 2, the subscriber user 104A has selected to share the video content item 210 with service provider subscriber user B 104B, and non-service provider subscriber users C and D 104C,D.

The content item link 204 may be created when the subscriber user 104A selects the video content item 210 that he/she wants to share, and may be embedded with the selected user's name. According to embodiments, the content item link 204 may be encrypted. The invitations 202B-D may comprise a token 208B-D or other authorization information, which may be used for tracking the sender (subscriber user 104A) and the one or more receivers (users 104B-D), for providing authorization information allowing the users 104B-D to watch protected content, and for authenticating the player 110. The users 104B-D may be enabled to stream the shared video content item 210 and watch the video content item 210 via the player 110 based on rules associated with the token 208.

Various types of rules may be applied. For example, rules may be applied that allow users 104B-D to watch the shared video content item 210 at the same time and if the shared video content item 210 is not watched at that time, the content item link 204 may expire. Alternatively, if the applied rules allow for the shared video content item 210 to be viewed later, the content item link 204 may expire at a later date/time. Applied rules may also allow for a specified number of viewings of the shared video content item 210. For example, the user 104B-D may be allowed to watch the shared video content item 210 once, twice, etc., or may be allowed to watch the shared video content item 210 an unlimited number of times within a certain predetermined time period. Shared video content items 210 may be grouped, for example, in a shared content folder that may be created for each user 104B-D. The shared content folder may be shared in its entirety, partially, per program, or per user 102B-D.

According to embodiments, to view a shared video content item 210, the receiving user 102B-D may either need to be a service provider subscriber with credentials that allow him/her to view the shared video content item 210, or else the receiving user's 104B-D client device 106B-D may be required to have the service provider video player 110 installed or be in communication with a network-based service provider video player 110. The invitation 202 may comprise a link to download the service provider video player 110 or a link to access the service provider video player 110 (herein referred to as a player download link 206). According to an embodiment, the player download link 206 may be sent with each invitation 202. According to another embodiment and as illustrated in FIG. 2, the player download link 206 may only be sent with invitations 202 to users 104 who are non-service provider subscribers. Accordingly, a determination may first be made as to whether the receiving user 104B-D is a service provider subscriber or not. This determination may be made according to credentials and provided account information associated with each user 104B-D. If a user 102B-D selects to view a shared video content item 210 via a client device 106 that does not have the service provider video player 110 installed or linked, the user 104B-D may be prompted to download the service provider video player 110 or connect to the network-based service provider video player 110.

Figure 3A:
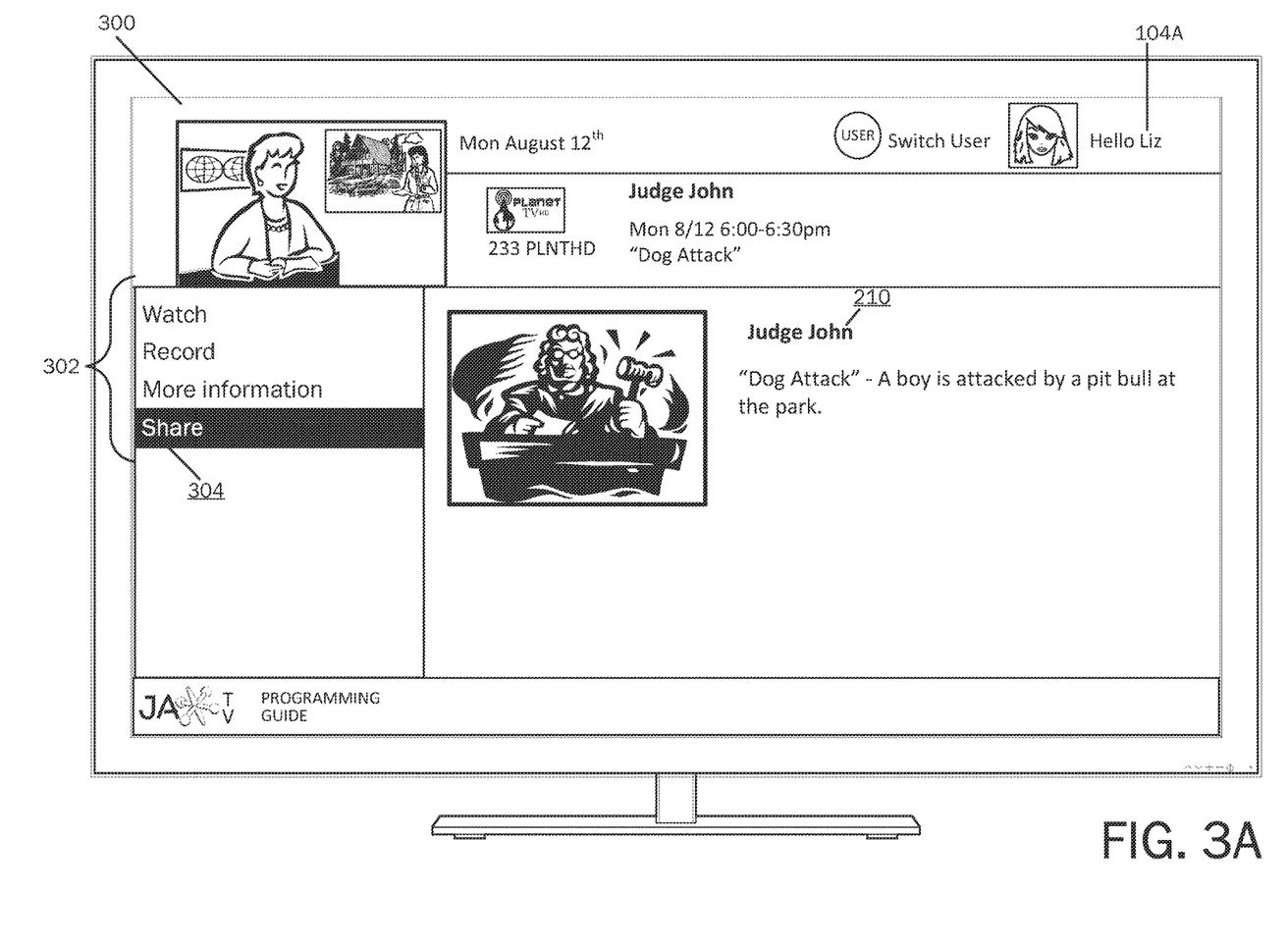
FIG. 3A illustrates an example user interface comprising an option to share a video content item.
Figure 3B:
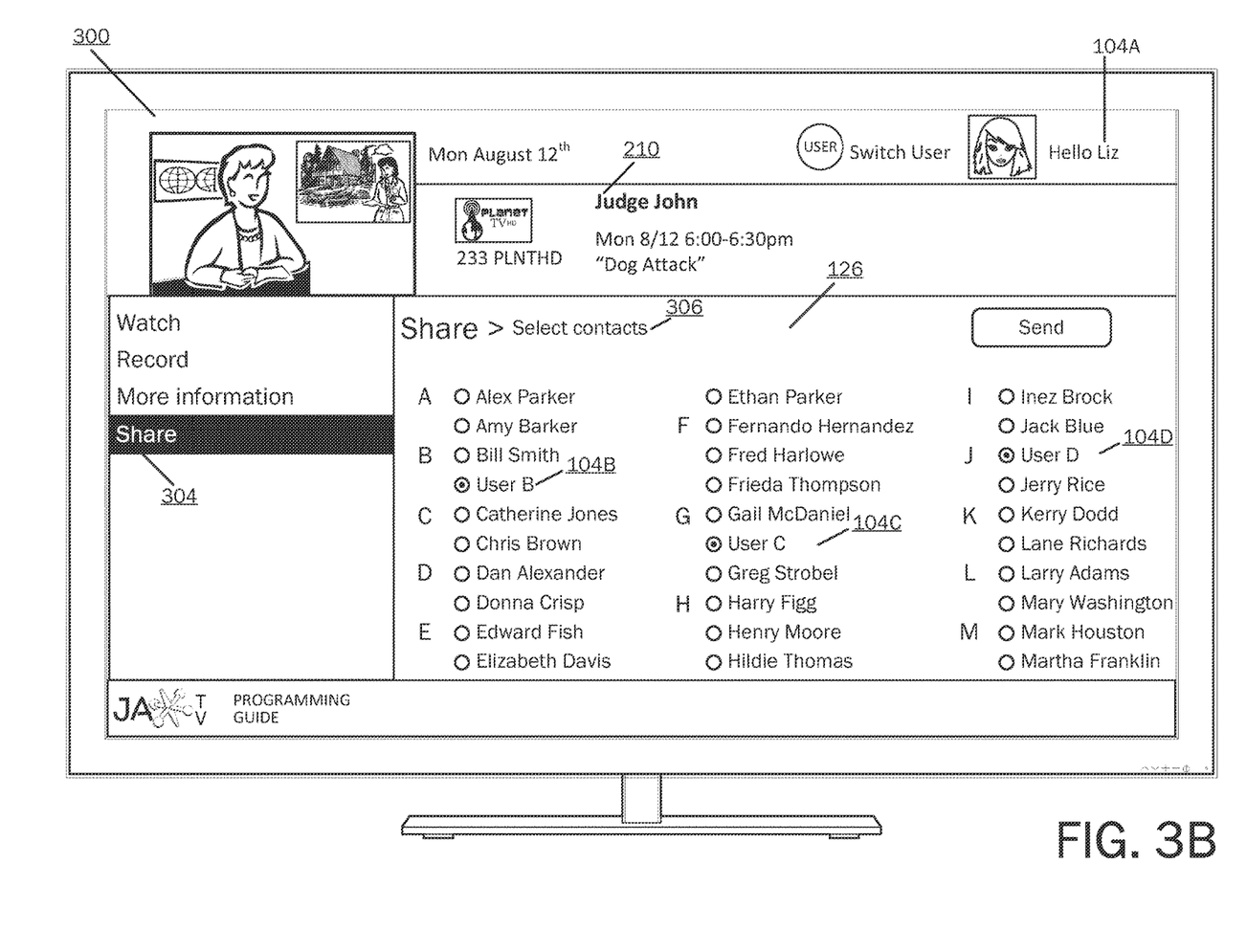
FIG. 3B illustrates an example user interface comprising a display of a subscribing user's aggregated contacts list from which the subscribing user can select with which friends to share the video content item.

FIGS. 3A and 3B are illustrations of one embodiment of a front end of the video sharing system 100 provided by a programming guide 300. With reference to FIG. 3A, a user interface comprising one or more selectable options 302 associated with a video content item 210 may be provided. For example, selectable options 302 may include an option to watch a selected video content item 210, an option to record a selected video content item 210, an option to view additional information about a selected video content item 210, and an option to share a selected video content item 210 (i.e., share option 304). A share option 304 may be provided via other means, for example, a button on a remote control device, or a selectable share option 304 on one of various other types of interface devices (e.g., mobile phone, game controller, tablet device, etc.). According to an embodiment, the video sharing system may be operable to identify and recognize which video content items 210 are allowed to be shared and which video content items 210 are not allowed to be shared. Fees may be associated with sharing some video content items 210, which other video content items 210 may be free to share with other users 104B-N. The system may be operable to recognize which video content items 210 may have fees associated with sharing of the content and which video content items 210 do not.

When the share option 304 is selected, a user interface may be provided in the programming guide 300 for selecting one or more users 104B-N with whom the subscriber user 104A wants to share the selected video content item 210. With reference to FIG. 3B, an example of a user interface 206 from which a subscriber user 104A may select one or more users 104B-N is illustrated. According to an embodiment, the user interface 206 may be populated with the subscriber user's aggregated contacts list 126 or a dynamic list based on collected information may be displayed.

Figure 4:
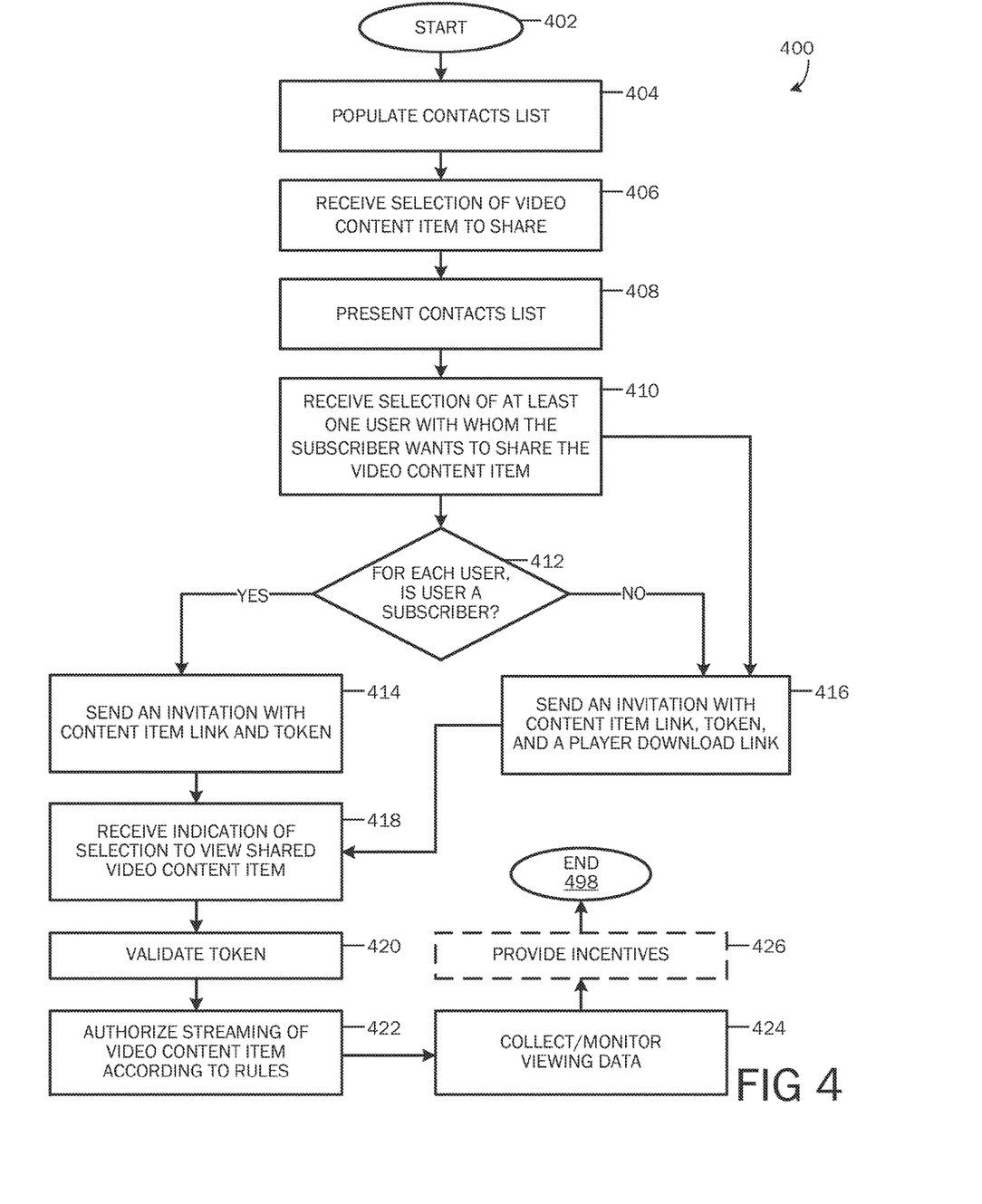
FIG. 4 is a flow chart of one embodiment of a method for sharing video content.

With reference now to FIG. 4, a flowchart of one embodiment of a method 400 for sharing a video content item 210 with one or more users 104B-N is illustrated. The method 400 starts are OPERATION 402, and proceeds to OPERATION 404 where the subscriber user's 104A friends lists and contacts lists may be aggregated across the subscriber user's 104A one or more social networking service 122 accounts, from a contacts list within the service provider system, and from other contacts lists. The friends lists and contacts lists may be sent to the back end application server 124, and stored in an aggregated contacts list 126. According to an embodiment, when a friends or contacts list is aggregated from a social networking service 122 account or other type of account, the source from where a specific contact is aggregated may be saved with the specific contact such that when a video content item 210 is shared with the contact, the invitation 202 may be automatically sent to the contact via the source from where the specific contact was aggregated.

At OPERATION 406, an indication of a selection to share a video content item 210 may be received. For example, the subscriber user 104A may select a video content item 210 listed in a programming guide 300 and select to share the video content item 210. As another example, the subscriber user 104A may be watching a video content item 210 and select to share the video content item 210.

At OPERATION 408, the subscriber user's aggregated contacts list 126 may be displayed. As described above, the aggregated contacts list 126 may comprise friends lists and contacts lists from the subscriber user's 104A one or more social networking service 122 accounts, from a contacts list within the service provider system, and from other contacts lists.

At OPERATION 410, an indication of a selection of at least one user 104B-N from the aggregated contacts list 126 or an indication of an input of a user's 104B-N contact information may be received.

According to an embodiment, the method 400 may either proceed to DECISION OPERATION 412 where a determination may be made for each selected user 104B-N whether the user is a service provider subscriber (e.g., a subscriber of video services from the same video service provider as the subscriber user 104A), or may proceed to OPERATION 416 where an invitation 202 comprising a content item link 204, a token 208, and a player download link 206 may be created and sent to each selected user 104B-N. The invitation 202 may be sent via various methods. For example, the invitation 202 may be sent in an email, an SMS message, via a social networking service 122, or may be sent to the user's service account and displayed in the user's programming guide 300. According to an embodiment, the invitation 202 may be automatically sent to each user 104B-N via the source from which the user's contact information was aggregated. For example, if the subscriber user 104A aggregates his/her contacts list from social media site X and social media site Y, and user B 104B is in the subscriber user's social media site X contacts list and user C 104C is in the subscriber user's social media site Y contacts list, the invitation may be automatically sent to user B 104B via social media site X and to user C 104C via social media site Y.

At DECISION OPERATION 412, the determination of whether a user 104B-N is or is not a subscriber of services from the same service provider as the subscriber user 104A may be made by checking the user's contact information with the service provider backend/application server 124.

If a determination is made at DECISION OPERATION 412 that a selected user 104B-N is a subscriber of services from the same service provider as the subscriber user 104A, the method 400 may proceed to OPERATION 414 where an invitation 202 comprising a content item link 204 and a token 208 may be sent to the user. The invitation 202 may be sent via various methods. For example, the invitation 202 may be sent in an email, an SMS message, via a social networking service 122, or may be sent to the user's service account and displayed in the user's programming guide 300. As described above, the invitation 202 may be automatically sent to each user 104B-N via the source from which the user's contact information was aggregated.

According to an embodiment, a determination of whether the selected user 104B-N is authorized to view the shared content item 210 may be made. For example, the shared content item 210 may be provided by a network that may be a premium or pay television network service. The determination may be made by checking the selected user's account information to determine whether the user is a subscriber to the network providing the content item 210. If the user is authorized to view the shared content item 210, the token 208 may provide for collection of and monitoring of viewing information associated with the content item 210. If the user is not authorized to view the shared content item 210, the token 208 may provide the user 104B-N authorization to access and watch the shared content item 210.

If a determination is made at DECISION OPERATION 412 that a selected user 104B-N is not a subscriber of services from the same service provider as the subscriber user 104A, the method 400 may proceed to OPERATION 416, where an invitation 202 comprising a content item link 204, a token 208, and a player download link 206 may be created and sent to the selected user 104B-N. The invitation 202 may be sent via various methods. For example, the invitation 202 may be sent in an email, an SMS message, or via a social networking service 122. As described above, the invitation 202 may be automatically sent to each user 104B-N via the source from which the user's contact information was aggregated. The token 208 may provide the user 104B-N authorization to access and watch the shared content item 210.

The method 400 may proceed from OPERATION 414 or OPERATION 416 to OPERATION 418, where an indication of a selection to view the shared video content item 210 may be received. For example, a receiving user 104B-D may select the content item link 204 received in the invitation 202. If the user's client device 106B-N has the service provider video player 110 installed (e.g., already installed, embedded, downloaded by the user 104B-D via a selection of the player download link 206, or network-accessible), the method 400 may proceed to OPERATION 420, where the token 208 sent with the invitation 202 may be authenticated.

If the token 208 is successfully authenticated, the method 400 may proceed to OPERATION 422, where the user's client device 106B-N may be authorized to stream the video content item 210 according to the rules associated with the token 208. If the user 104B-D is a subscriber of video services with the service provider and if the user 104B-D is authorized to view the shared content item 210, the video content item 210 may be streamed according to the user's 104B-D service agreement.

At OPERATION 424, viewing data may be collected and monitored. For example, viewing data may include such information as who is viewing the shared video content item 210 (e.g., how many users a subscriber user 104A shares a video content item 210 with, when users 102B-D view the shared video content item 210, on what client devices 106B-N users 102B-D view the shared video content item 210, etc.

The method 400 may optionally proceed to OPERATION 426, where incentives may be provided. For example, subscriber users 104A may collect incentives when watching and/or sharing certain types of content or advertisements. Incentives may be used for access to certain content items, to share other content items with other users, etc. The method 400 ends at OPERATION 498.

Figure 5:
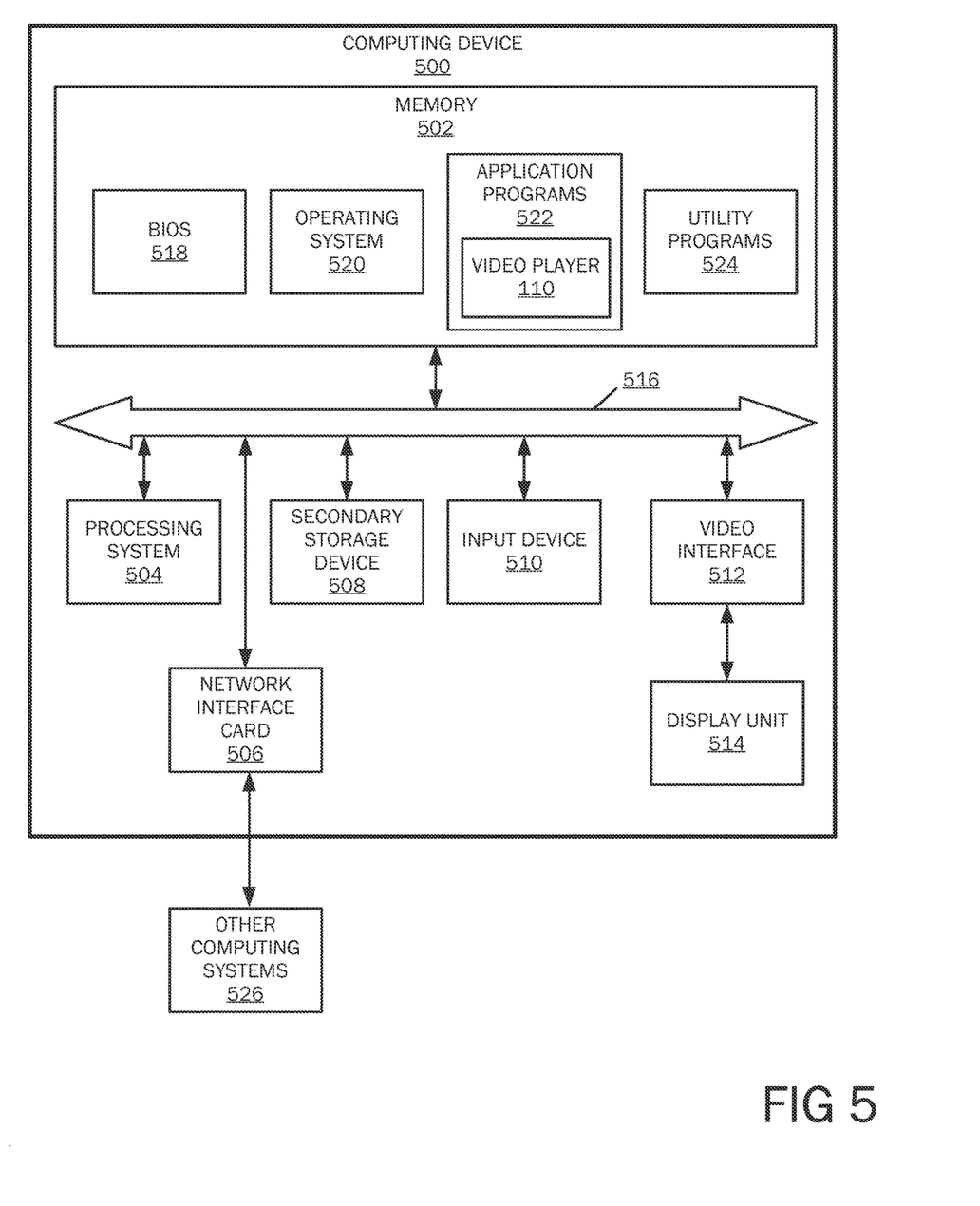
FIG. 5 is a block diagram illustrating example physical components of a computing device with which embodiments may be practiced.

FIG. 5 is a block diagram illustrating example physical components of a computing device 500 with which embodiments may be practiced. In some embodiments, one or a combination of the components of the video sharing system 100 may be implemented using one or more computing devices like the computing device 500. It should be appreciated that in other embodiments, one or a combination of the components of the video sharing system 100 may be implemented using computing devices having hardware components other than those illustrated in the example of FIG. 5.

Computing devices may be implemented in different ways in different embodiments. For instance, in the example of FIG. 5, the computing device includes a processing system 504, memory 502, a network interface 506, a secondary storage device 508, an input device 510, a video interface 512, a display unit 514, and a communication medium 516. In other embodiments, the computing device 500 may be implemented using more or fewer hardware components (e.g., a video interface, a display unit, or an input device) or in combination with other types of computer systems and program modules. The memory 502 includes one or more computer-readable storage media capable of storing data and/or computer-executable instructions. According to an embodiment, the service provider video player 110 may be stored locally on computing device 500. Memory 502 thus may store the computer-executable instructions that, when executed by processor 504, provide authorized access to shared video content items 210 as described herein.

In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, keypads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be a an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface card 506, the secondary storage device 508, the input device 510, and the video interface 512. In different embodiments, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs 522 that, when executed by the processing system 504, cause the computing device 500 to provide applications to users, for example, one or more components of the video sharing system 100. The memory 502 also stores one or more utility programs 524 that, when executed by the processing system 504, cause the computing device 500 to provide utilities to other software programs. Embodiments of the present invention may be utilized in various distributed computing environments where tasks are performed by remote processing devices that are linked through a communications network in a distributed computing environment.

Figure 6A:
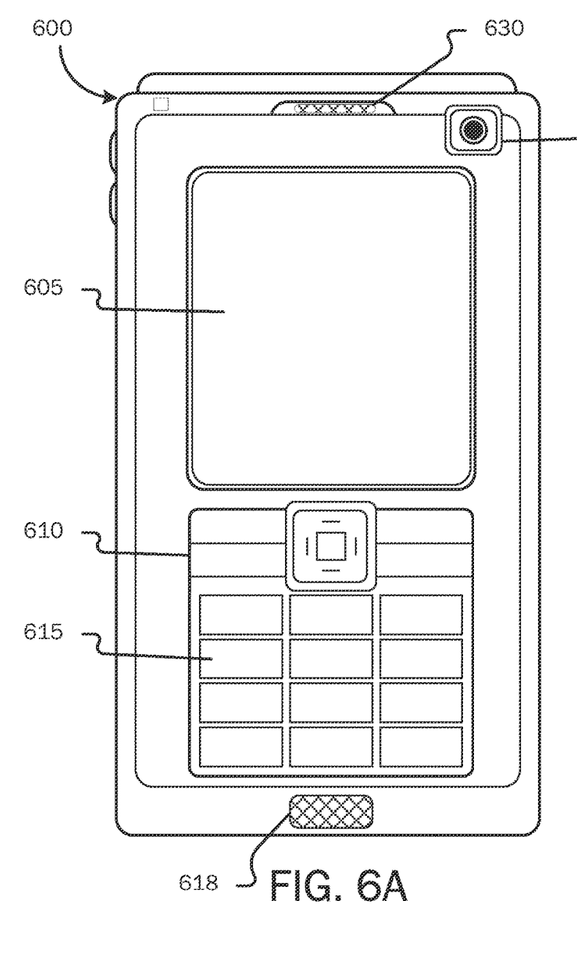
FIGS. 6A-6B illustrate a suitable mobile computing environment with which embodiments may be practiced.
Figure 6B:
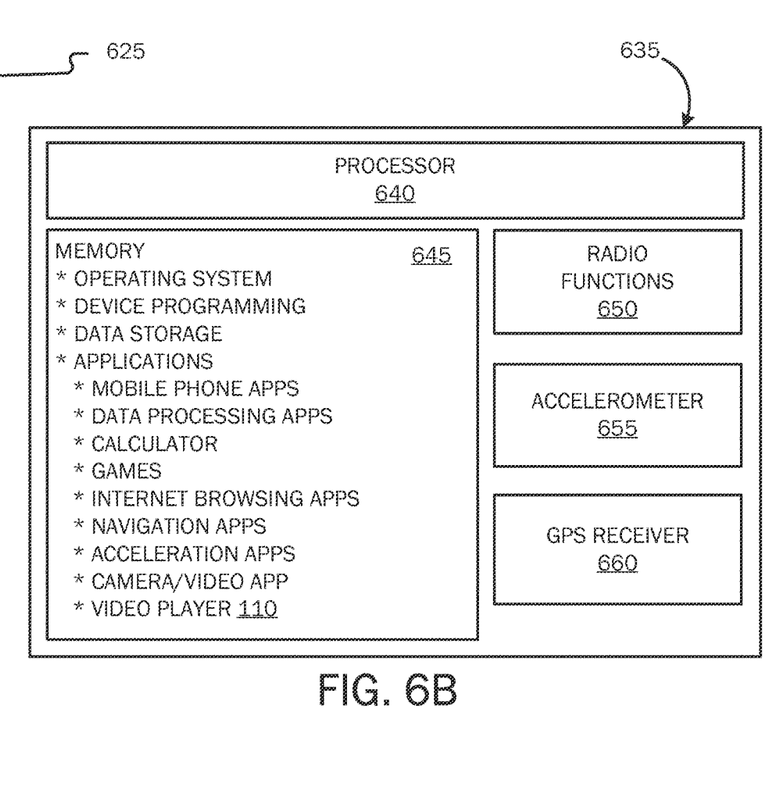

FIGS. 6A-6B illustrate a suitable mobile computing environment, for example, a mobile computing device 600 embodied as a mobile phone 106N, a tablet personal computer 106C, a laptop computer 106D, and the like, with which embodiments may be practiced. The mobile computing device 600 is illustrative of any suitable device operative to send, receive and process wireless communications according to embodiments of the present invention. A display screen 605 is operative for displaying a variety of information such as information about incoming and outgoing communications, as well as, a variety of data and displayable objects, for example, text, alphanumeric data, photographs, and the like.

Data input to the device 600 may be performed via a variety of suitable means, such as, touch screen input via the display screen 605, keyboard or keypad input via a data entry area 610, key input via one or more selectable buttons or controls 615, voice input via a microphone 618 disposed on the device 600, photographic input via a camera 622 functionality associated with the mobile computing device, or any other suitable input means. Data may be output via the device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a general purpose computer processor for processing incoming and outgoing data and communications and controlling operation of the device and associated software applications via a mobile computing device operating system. Memory 645 may be utilized for storing a device operating system, device programming, one or more stored applications, for example, mobile telephone applications, data processing applications, the service provider video player 110, calculators, games, Internet browsing applications, navigation applications, acceleration applications, camera and/or video applications, etc.

Mobile computing device 600 may contain an accelerometer 715 for detecting acceleration, and can be used to sense orientation, vibration, and/or shock. Mobile computing device 600 may contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the device 600 to communicate with other communication devices and systems via a wireless network. Radio functions 650 may be utilized to communicate with a wireless or WIFI-based positioning system to determine a device's 600 location.

Figure 7:
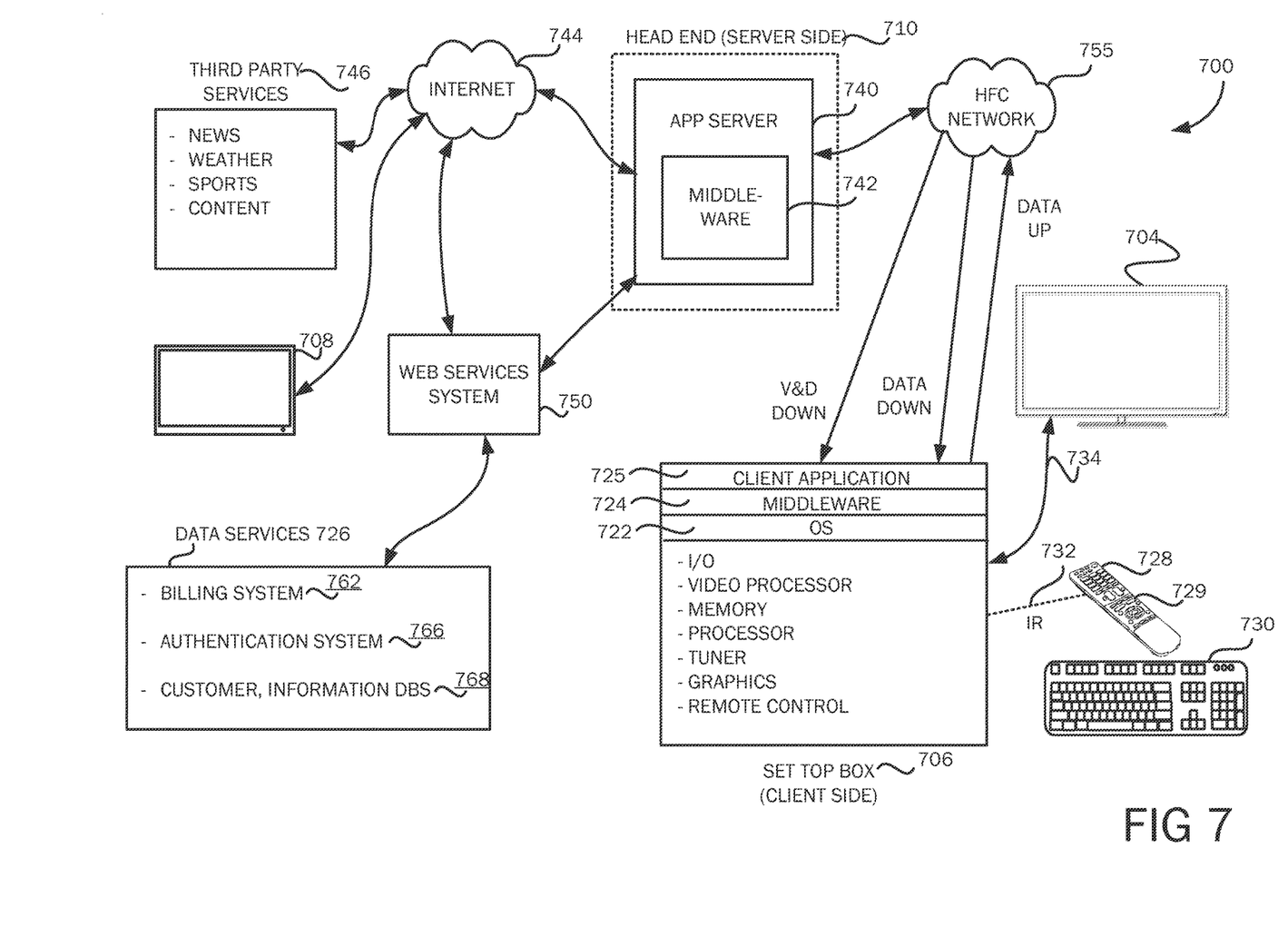
FIG. 7 is a simplified block diagram illustrating one embodiment of a cable television services system providing video content sharing.

FIG. 7 is a simplified block diagram illustrating one embodiment of a cable television services system providing video sharing functionality. As can be appreciated, a cable television services system (CATV) 700 is but one of various types of systems that may be utilized to provide the functionality described herein. Digital and analog video programming, information content and interactive television services are provided via a hybrid fiber-coax (HFC) network 755 to a television set 704 for consumption by a cable television/services system customer. As is known to those skilled in the art, HFC networks 755 combine both optical fiber and coaxial cable lines. Typically, optical fiber runs from the cable headend 710 to neighborhoods of subscribers. Coaxial cable runs from the optical fiber feeders to each customer or subscriber. The functionality of the HFC network 755 allows for efficient bidirectional data flow between the client-side set-top box 706 and a server-side application server 740.

The CATV system 700 is in the form of a distributed client-server computing system for providing video and data flow across the HFC network 755 between server-side services providers (e.g., cable television/services providers) via a server-side headend 710 and a client-side customer via a client-side set-top box (STB) 706 functionally connected to a customer receiving device, such as the television set 704. As is understood by those skilled in the art, CATV systems 700 may provide a variety of services across the HFC network 715 including digital and analog video programming, telephone services, high speed Internet access, video-on-demand, and information services.

On the client side of the CATV system 700, digital and analog video programming and digital and analog data are provided to the customer television set 704 via the STB 706. Interactive television services that allow a customer to input data to the CATV system 700 likewise are provided by the STB 706. As illustrated in FIG. 7, the STB 706 is a multipurpose computing device having a computer processor, memory, and an input/output mechanism. The input/output mechanism receives input from server-side processes via the HFC network 755 and from customers via input devices such as the remote control device 728, keyboard 730, or other computing device, such as a tablet/slate computer, smart phone, etc. The remote control device 728 and the keyboard 730 may communicate with the STB 706 via a suitable communication transport such as the infrared connection 732. The STB 706 also includes a video processor for processing and providing digital and analog video signaling to the television set 704 via a cable communication transport 734. A multi-channel tuner is provided for processing video and data to and from the STB 706 and the server-side headend system 710, described below.

The STB 706 also includes an operating system 722 for directing the functions of the STB 706 in conjunction with a variety of client applications 725, for example, service provider video player 110. For example, if a client application 725 requires a news flash from a third-party news source to be displayed on the television 704, the operating system 722 may cause the graphics functionality and video processor of the STB 706, for example, to output the news flash to the television 704 at the direction of the client application 725 responsible for displaying news items.

Because a variety of different operating systems 722 may be utilized by a variety of different brands and types of set-top boxes, a middleware layer 724 may be provided to allow a given software application to be executed by a variety of different operating systems. According to an embodiment, the middleware layer 724 may include a set of application programming interfaces (APIs) that are exposed to client applications 725 and operating systems 722 that allow the client applications to communicate with the operating systems through common data calls understood via the API set. As described below, a corresponding middleware layer is included on the server side of the CATV system 700 for facilitating communication between the server-side application server and the client-side STB 706. The middleware layer 742 of the server-side application server and the middleware layer 724 of the client-side STB 706 may format data passed between the client side and server side according to the Extensible Markup Language (XML).

According to one embodiment, the set-top box 706 passes digital and analog video and data signaling to the television 704 via a one-way communication transport 734. According to other embodiments, two-way communication transports may be utilized, for example, via high definition multimedia (HDMI) ports. The STB 706 may receive video and data from the server side of the CATV system 700 via the HFC network 715 through a video/data downlink and data via a data downlink. The STB 706 may transmit data from the client side of the CATV system 700 to the server side of the CATV system 700 via the HFC network 715 via one data uplink. The video/data downlink is an in-band downlink that allows for digital and analog video and data signaling from the server side of the CATV system 700 through the HFC network 715 to the set-top box 706 for use by the STB 706 and for distribution to the television set 704. The in-band signaling space operates in a specified frequency divided into channels. Each channel carries one or more signals, such as a single analog signal or multiple digital signals.

The data downlink and the data uplink, illustrated in FIG. 7, between the HFC network 715 and the set-top box 706 comprise out-of-band data links. The out-of-band frequency range is generally lower than the in-band signaling frequency range. Data flow between the client-side set-top box 706 and the server-side application server 740 is typically passed through the out-of-band data links. Alternatively, an in-band data carousel may be positioned in an in-band channel into which a data feed may be processed from the server-side application server 740 through the HFC network 715 to the client-side STB 706. Operation of data transport between components of the CATV system 700 is well known to those skilled in the art.

The headend 710 of the CATV system 700 is positioned on the server side of the CATV system and includes hardware and software systems responsible for originating and managing content for distributing through the HFC network 715 to client-side STBs 706 for presentation to customers via televisions 704. As described above, a number of services may be provided by the CATV system 700, including digital and analog video programming, interactive television services, telephone services, video-on-demand services, targeted advertising, and provision of information content.

The application server 740 is a computing system operative to assemble and manage data sent to and received from the client-side set-top box 706 via the HFC network 715. As described above with reference to the set-top box 706, the application server 740 includes a middleware layer 742 for processing and preparing data from the headend of the CATV system 700 for receipt and use by the client-side set-top box 706. For example, the application server 740 via the middleware layer 742 may obtain data, such as content or content metadata, from third-party services 746 via the Internet 744 for transmitting to a customer through the HFC network 715 and the set-top box 706. When the application server 740 receives the downloaded content metadata, the middleware layer 742 may be utilized to format the content metadata for receipt and use by the set-top box 706. Therefore, content metadata may be sent and categorized based on the availability to the customer's program guide data. Similarly, content (e.g., Internet television content and other internet protocol video-based content) may be displayed to the customer on the user's client device 704,708.

According to one embodiment, data obtained and managed by the middleware layer 742 of the application server 740 is formatted according to the Extensible Markup Language and is passed to the set-top box 706 through the HFC network 715 where the XML-formatted data may be utilized by a client application 725 in concert with the middleware layer 724, as described above. As should be appreciated by those skilled in the art, a variety of third-party services data, including news data, weather data, sports data and other information content may be obtained by the application server 740 via distributed computing environments such as the Internet 744 for provision to customers via the HFC network 715 and the set-top box 706.

According to embodiments, the application server 740 obtains customer support services data, including billing data, information on customer work order status, answers to frequently asked questions, services provider contact information, and the like from data services 760 for provision to the customer via an interactive television session. In the illustrated embodiment, the services provider data services 760 include a number of services operated by the services provider of the CATV system 700 which may include data on a given customer.

A billing system 762 may include information such as a customer's name, street address, business identification number, Social Security number, credit history, and information regarding services and products subscribed to by the customer. According to embodiments, the billing system 762 may also include billing data for services and products subscribed to by the customer for bill processing, billing presentment and payment receipt.

A customer information database 768 may include general information about customers such as place of employment, business address, business telephone number, and demographic information such as age, gender, educational level, and the like. The customer information database 768 may also include information on pending work orders for services or products ordered by the customer. The customer information database 768 may also include general customer information such as answers to frequently asked customer questions and contact information for various service provider offices/departments. As should be understood, this information may be stored in a variety of disparate databases operated by the cable services provider.

A web services system 750 serves as a collection point for data requested from each of the disparate data services systems comprising the data services 760. According to embodiments, when the application server 740 requires customer services data from one or more of the data services 760, the application server 740 passes a data query to the web services system 750. The web services system formulates a data query to each of the available data services systems for obtaining any required data for a requesting customer as identified by a set-top box identification associated with the customer. The web services system 750 serves as an abstraction layer between the various data services systems and the application server 740. That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above.

An authentication system 765 may include information such as secure user names, subscriber profiles, subscriber IDs, and passwords utilized by customers for access to network services. As should be understood by those skilled in the art, the disparate systems 762, 764, 765, 768 may be integrated or provided in any combination of separate systems, wherein FIG. 7 shows only one example.

Embodiments the invention may be used in combination with any number of computer systems, such as in desktop environments, laptop or notebook computer systems, multiprocessor systems, micro-processor based or programmable consumer electronics, networked PCs, mini computers, main frame computers, mobile communication device systems and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to the Figures. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method comprising:
   aggregating a list of users associated with a subscribing user of a subscriber television system to generate an aggregated list of users from:
   one or more social networking accounts;
   a service provider contacts list; and
   other contacts lists;
   storing the aggregated list of users;
   providing a programming guide for the subscribing user of the subscriber television system by a service provider of the subscribing user that includes selectable options including an option to watch a video content item, an option to record the video content item, an option to view additional information about the video content item, and an option to share the video content item;
   dynamically populating a user interface associated with the programming guide with the aggregated list of users from the one or more social networking accounts, the service provider contacts list, and other contacts lists to enable selection of one or more users from the one or more social networking accounts, the service provider contacts list, and other contacts lists for sharing the video content item;
   receiving an indication of a selection of the option to share the video content item via the programming guide with selected users from the aggregated list of users;
   creating an invitation after receiving the indication of the selection of the option to share the video content item via the programming guide, the invitation comprising a link to the video content item, a link to a video player to play the video content item, and a token, wherein the token is used for: tracking a sender and the selected users from the aggregated list of users; providing authorization information to allow watching of protected content; and authenticating the video player associated with the link to the video player, wherein when a friends or contacts list is aggregated from the one or more social networking accounts or other type of account, a source from where a specific contact is aggregated is saved with the specific contact such that when the video content item is shared with the specific contact, the invitation is automatically sent to the specific contact via the source from where the specific contact was aggregated;
   sending the invitation via the programming guide to each of the selected users;
   receiving a request from a client device to stream the video content item;
   validating the token;
   applying a rule of a number of rules associated with the token to allow the selected users to watch the video content item at the same time and allowing the link to expire if the video content item is not watched at that time; and
   authorizing streaming of the video content item on the requesting client device via the video player according to the number of rules associated with the token.

2. The method of claim 1, wherein prior to creating the invitation, determining whether each of the selected users is a subscriber of video services from a same service provider as the subscribing user.

3. The method of claim 2, further comprising:
   for each of the selected users determined not to be a subscriber of video services from the same service provider as the subscribing user, sending a link to download a service provider video player or access a network-based service provider video player.

4. The method of claim 2, wherein prior to validating the token, for each of the selected users determined to be a subscriber of video services from the same service provider as the subscribing user, determining whether the user is authorized to access the video content item.

5. The method of claim 4, further comprising:
   for each user determined not to be authorized to watch the video content item, authorizing the user to access the video content item.

6. The method of claim 1, wherein authorizing streaming of the video content item on the requesting client device comprises authorizing streaming of the video content item via a service provider video player.

7. The method of claim 1, further comprising collecting and monitoring sharing and viewing data via the token.

8. The method of claim 1, wherein sending the invitation to each of the selected users comprises sending the invitation via one or more of:
   email; or
   text message.

9. The method of claim 1, wherein sending the invitation to each of the selected users comprises sending the invitation to each selected user through the social networking account from which respective contact information was aggregated.

10. A system comprising:
    a memory storage; and
    one or more processors coupled to the memory storage operable to:
    aggregate a list of users associated with a subscribing user of a subscriber television system to generate an aggregated list of users from:
    one or more social networking accounts;
    a service provider contacts list; and
    other contacts lists;
    store the aggregated list of users;
    provide a programming guide for the subscribing user of the subscriber television system by a service provider of the subscribing user that includes selectable options including an option to watch a video content item, an option to record the video content item, an option to view additional information about the video content item, and an option to share the video content item;

dynamically populate a user interface associated with the programming guide with the aggregated list of users from the one or more social networking accounts, the service provider contacts list, and other contacts lists to enable selection of one or more users from the one or more social networking accounts, the service provider contacts list, and other contacts lists for sharing the video content item;

receive an indication of a selection of the option to share the video content item via the programming guide with selected users from the aggregated list of users;

create an invitation after receiving the indication of the selection of the option to share the video content item via the programming guide, the invitation comprising a link to the video content item, a link to a video player to play the video content item, and a token, wherein the token is used to: track the sender and the selected users from the aggregated list of users; provide authorization information to allow watching of protected content; and authenticate the video player associated with the link to the video player, wherein when a friends or contacts list is aggregated from the one or more social networking accounts or other type of account, a source from where a specific contact is aggregated is saved with the specific contact such that when the video content item is shared with the specific contact, the invitation is automatically sent to the specific contact via the source from where the specific contact was aggregated;

send the invitation via the programming guide to each of the selected users;

receive a request from a client device to stream the video content item;

validate the token;

apply a rule of a number of rules associated with the token to allow the selected users to watch the video content item at the same time and allow the link to expire if the video content item is not watched at that time; and authorize streaming of the video content item on the requesting client device via the video player according to the number of rules associated with the token.

11. The system of claim 10, wherein prior to creating the invitation, the one or more processors are further operable to determine whether each of the selected users is a subscriber of video services from a same service provider as the subscribing user.

12. The system of claim 11, wherein the one or more processors are further operable to send a link to download a service provider video player or access a network-based service provider video player to each of the selected users determined not to be a subscriber of video services from the same service provider as the subscribing user.

13. The system of claim 11, wherein the one or more processors are further operable to:
determine whether a user is authorized to access the video content item; and
if the user is not authorized to watch the video content item, authorize the user to access the video content item.

14. The system of claim 10, wherein in authorizing streaming of the video content item on the requesting client device, the one or more processors are further operable to authorize streaming of the video content item via a service provider video player.

15. The system of claim 10, wherein the one or more processors are further operable to collect and monitor sharing and viewing data via the token.

16. A method comprising the acts of:
providing a programming guide for a subscribing user of a subscriber television system by a service provider of the subscribing user that includes selectable options including an option to watch a video content item, an option to record the video content item, an option to view additional information about the video content item, and an option to share the video content item;

receiving an indication of a selection of the video content item via a programming guide provided by a service provider of the subscribing user;

receiving an indication of a selection of the option to share the video content item via the programming guide;

providing an aggregated list of users associated with a subscribing user to generate an aggregated list of users from:
one or more social networking accounts;
a service provider contacts list; and
other contacts lists;

dynamically populating a user interface associated with the programming guide with the aggregated list of users from the one or more social networking accounts, the service provider contacts list, and other contacts lists to enable selection of one or more users from the one or more social networking accounts, the service provider contacts list, and other contacts lists for sharing the video content item;

receiving a selection of at least one user from the aggregated list of users with whom the subscribing user would like to share the video content item;

requesting an invitation to be sent via the programming guide to each selected user after receiving the indication of the selection of the option to share the video content item via the programming guide, the invitation comprising a link to the video content item, a link to a video player to play the video content item, and a token, wherein the token is used for: tracking the sender and the selected users from the aggregated list of users; providing authorization information to allow watching of protected content; and authenticating the video player associated with the link to the video player, wherein when a friends or contacts list is aggregated from the one or more social networking accounts or other type of account, a source from where a specific contact is aggregated is saved with the specific contact such that when the video content item is shared with the specific contact, the invitation is automatically sent to the specific contact via the source from where the specific contact was aggregated;

applying a rule of a number of rules associated with the token to allow the selected users to watch the video content item at the same time and allowing the link to expire if the video content item is not watched at that time; and authorizing streaming of the video content item via the video player according to the number of rules associated with the token.

17. The method of claim 16, wherein the token provides authentication information authorizing each selected user to access the video content item and a link between the subscribing user and each selected user utilized to collect sharing and viewing data associated with the video content item.

18. The method of claim 16, wherein if a selected user is not a subscriber of video services from a same service provider as the subscribing user, requesting a link to download a service provider video player or access a network-based service provider video player.

* * * * *